United States Patent
Nishio et al.

(10) Patent No.: US 6,952,975 B2
(45) Date of Patent: Oct. 11, 2005

(54) SEAT OCCUPANT SENSOR WITH STOPPER MECHANISM

(75) Inventors: Eiichi Nishio, Nagoya (JP); Akinori Jitsui, Okazaki (JP); Hajime Nakagawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/811,959

(22) Filed: Mar. 30, 2004

(65) Prior Publication Data

US 2004/0187609 A1 Sep. 30, 2004

(30) Foreign Application Priority Data

Mar. 31, 2003 (JP) .......................................... 2003-095472

(51) Int. Cl.[7] .................................................. G01L 1/04
(52) U.S. Cl. .................................................. 73/862.451
(58) Field of Search ...................... 73/862.381, 862.471, 73/862.474, 862.382, 862.451

(56) References Cited

U.S. PATENT DOCUMENTS 6,039,344 A * 3/2000 Mehney et al. ............. 280/735
6,571,647 B1 6/2003 Aoki et al.
6,759,603 B2 * 7/2004 Curtis et al. ................. 177/144

FOREIGN PATENT DOCUMENTS

| JP | 9-207638 | 8/1997 |
|---|---|---|
| JP | 2000-258234 | 9/2000 |
| JP | 2002-243528 | 8/2002 |

* cited by examiner

*Primary Examiner*—Max Noon
(74) *Attorney, Agent, or Firm*—Posz Law Group, PLC

(57) ABSTRACT

A seat occupant sensor for use in automotive occupant restraint systems. The sensor has a sensing plate cantilevered by a stationary part installed on a vehicle body to be bent upon application of a weight load of an occupant on a seat. The sensor is equipped with a stopper mechanism which works to stop the sensing plate from bending out of a predetermined range in which the sensing plate is allowed to undergo a maximum bending stress within a bending stress limit of the sensing plate, thereby avoiding undesirable deflection or fracture of the sensing plate.

20 Claims, 15 Drawing Sheets

TABLE I

BENDING MODE AND DYNAMIC MODEL UPON APPLICATION OF OFFSET LOAD

FIG. 7

TABLE II

SENSOR INSTALLED ORIENTATION AND BENDING MODE UPON APPLICATION OF OFFSET LOAD

----- IDEAL S-CURVE     —— NONIDEAL CURVE

FIG. 8

STOPPER DISPLACEMENT EQUATION

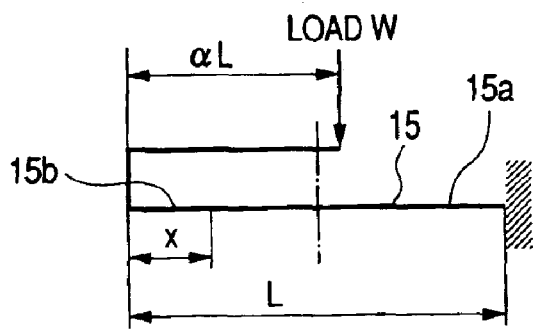

$$M(x) = Wx - \alpha LW \quad \cdots (1)$$

$$\frac{d^2y}{dx^2} = \frac{-M}{EI} = \frac{W}{EI}(\alpha L - x)$$

ANGLE OF INCLINATION OF SENSING PLATE $$Ik(x) = \frac{dy}{dx}$$

$$= \frac{W}{2EI}\{-x^2 + 2\alpha L \cdot x + (1 - 2\alpha)L^2\} \quad \cdots (2)$$

DISPLACEMENT OF SENSING PLATE
(EXPRESSED BY POSITIVE VALUE IN DOWNWARD DIRECTION)

$$Yk(x) = \int Ik(x)\,dx$$

$$= \frac{(-W)}{6EI}\{-x^3 + 3\alpha L \cdot x^2 + (3 - 6\alpha)L^2 \cdot x + (3\alpha - 2)L^3\} \quad \cdots (3)$$

FIG. 9(a)
STOPPER DISPLACEMENT EQUATION

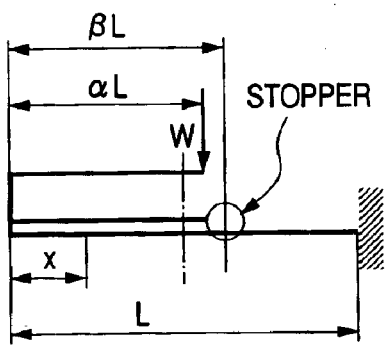

FIG. 9(b)
STOPPER DISPLACEMENT EQUATION

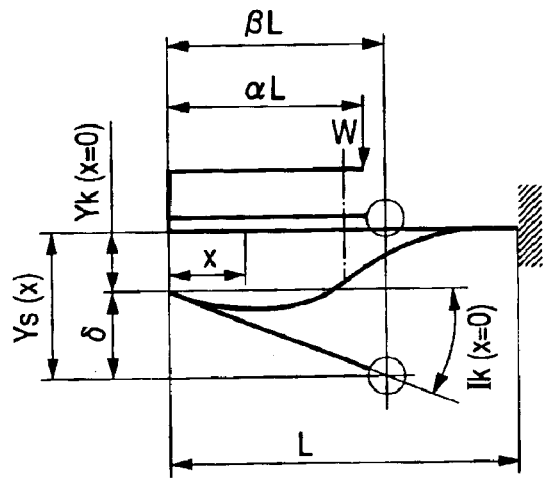

$\alpha L$: APPLIED LOCATION OF LOAD
$\beta L$: STOPPER POSITION
Ys: STOPPER DISPLACEMENT $$Y_s = Y_k(x=0) + \delta$$
$$= Y_k(x=0) + \beta \cdot L \cdot \tan\{I_k(x=0)\}$$
$$= \frac{WL^3}{6EI}\{(2-3\alpha) - 3\beta(1-2\alpha)\} \quad \cdots(4)$$

$$\sigma_{max} = \frac{M_{max}}{Z} = -\frac{\alpha LW}{Z} \quad \cdots(5)$$

$$Y_s = \frac{L^2}{3\alpha Et}\{(2-3\alpha) - 3\beta(1-2\alpha)\} \cdot \sigma_{max} \quad \cdots(6)$$

$$Y_s = \frac{2L^3}{Ebt^3}\{(2-3\alpha) - 3\beta(1-2\alpha)\} \cdot W \quad \cdots(7)$$

FIG. 10

TABLE III

| BENDING MODE | | STOPPER DISPLACEMENT-TO-POSITION RELATION |
|---|---|---|
| IDEAL S-CURVE BENDING MODE | CENTER LOAD | $Y_s$: STOPPER DISPLACEMENT<br>$Y_k$: MOVABLE END DISPLACEMENT<br>$Y_s = Y_k (x=0)$<br>STOPPER DISPLACEMENT IS INDEPENDENT OF STOPPER POSITION |
| OFFSET LOAD APPLY MODE — FIXED END OFFSET LOAD APPLY MODE | FIXED END SIDE LOAD | $\delta$: STOPPER DISPLACEMENT RESULTING FROM INCLINATION OF MOVABLE END<br>$Y_s = Y_k(x=0) + \delta$<br>$= Y_k(x=0) + L_s \cdot \tan[I_k(x=0)]$<br>STOPPER DISPLACEMENT DEPENDS ON STOPPER POSITION |
| OFFSET LOAD APPLY MODE — MOVABLE END OFFSET LOAD APPLY MODE | MOVABLE END SIDE LOAD | $Y_s = Y_k(x=0) - \delta$<br>$= Y_k(x=0) - L_s \cdot \tan[I_k(x=0)]$<br>STOPPER DISPLACEMENT DEPENDS ON STOPPER POSITION |

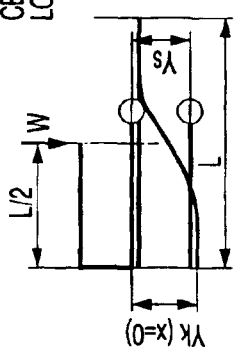
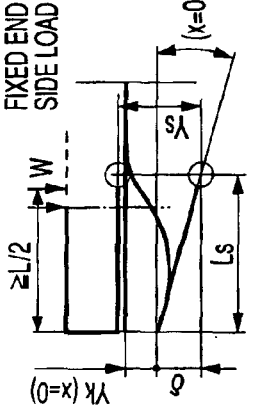
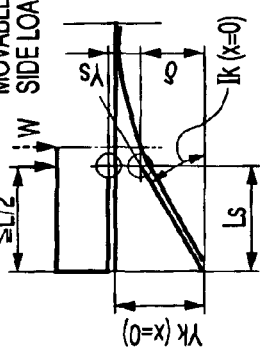

$\delta u = \dfrac{L^2}{2Et} \cdot \beta \cdot \sigma e \quad \cdots (6, 1)$ $\delta u - \delta l = Yt = \dfrac{L^2}{2Et} \cdot \sigma e \cdot \beta - \dfrac{L^3 \cdot W1}{Ebt^3} \quad \cdots (8)$ $\delta l = \dfrac{L^3 \cdot W1}{Ebt^3} \quad \cdots (7, 1)$ δl = STRESS LIMIT

W1 = LOWEST LOAD IN LOAD MEASUREMENT RANGE

FIG. 14

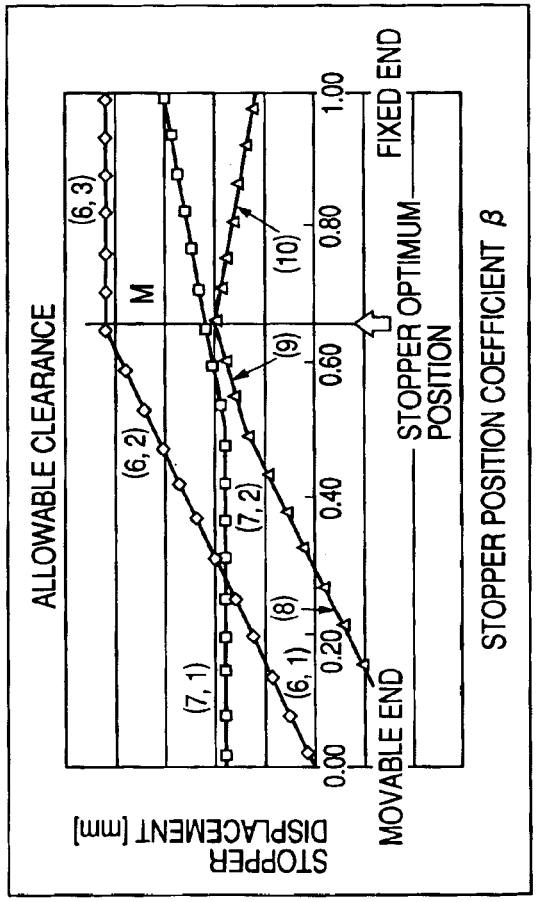
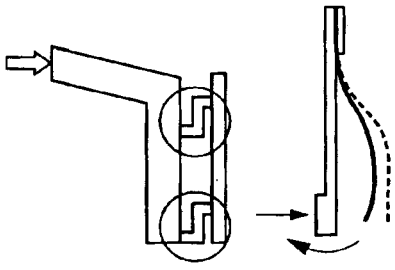
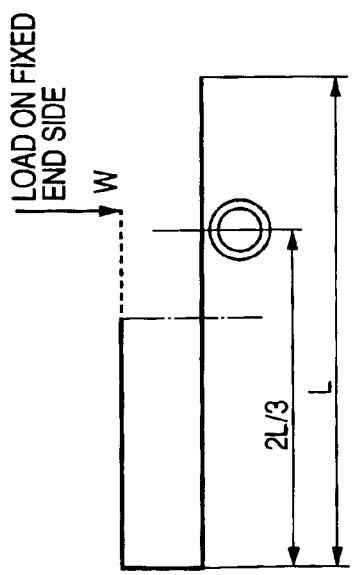

STOPPER OPTIMUM POSITION FOR REAR SENSOR INSTALLED IN SAME DIRECTIONAL FORWARD ORIENTATION WHEN OFFSET LOAD IS APPLIED TO FIXED END SIDE

◇ UPPER LIMIT $\delta u$
□ LOWER LIMIT $\delta l$
△ ALLOWABLE CLEARANCE $Y t$ $$Y t = \frac{L^2}{2Et} \cdot \sigma e \cdot \beta - \frac{L^3 \cdot W_1}{Ebt^3} \quad \ldots (8)$$

$$Y t = \frac{L^2}{2Et} \cdot \beta \cdot \sigma e - \frac{2L^3 \cdot \beta \cdot W_1}{Ebt^3} \quad \ldots (9)$$

$$Y t = \frac{L^2}{3Et} \cdot \sigma e - \frac{2L^3 \cdot \beta \cdot W_1}{Ebt^3} \quad \ldots (10)$$

FIG. 15
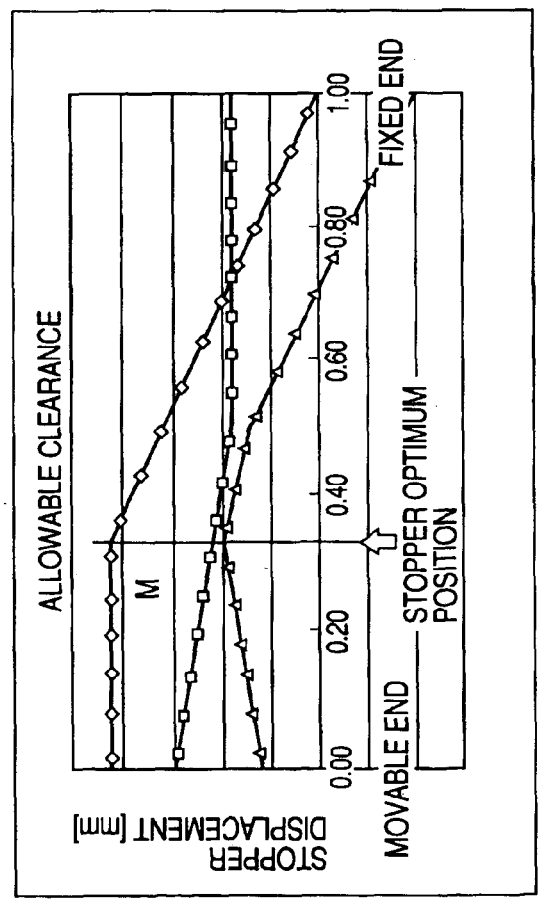
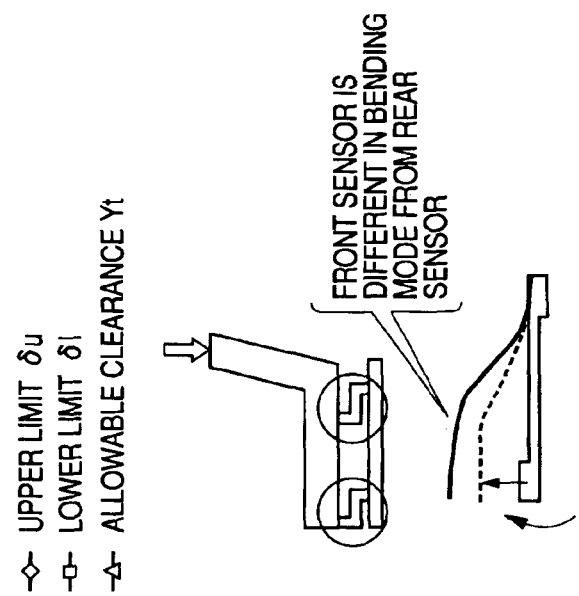
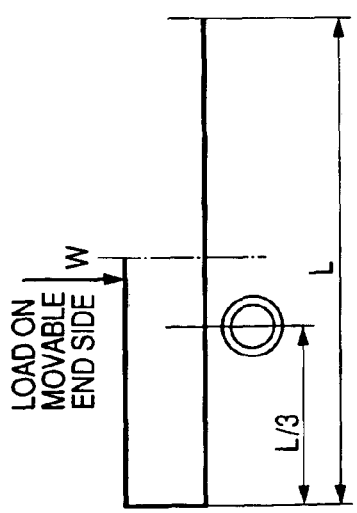

SEAT OCCUPANT SENSOR WITH STOPPER MECHANISM

BACKGROUND OF THE INVENTION

1. Technical Field of the Invention

The present invention relates generally to a seat occupant sensor equipped with a stopper mechanism which has a cantilevered elastic sensing plate working to determine the presence or absence and/or the size of a person on a seat, and more particularly to a stopper mechanism for such a sensor which works to permit the degree of bending of the sensing plate to be maximized without causing mechanical damage thereto.

2. Background Art

Japanese Patent First Publication Nos. 2002-243528 and 9-207638 teach a seat occupant discrimination system for automotive vehicles equipped with an airbag for protecting a passenger from an accidental collision. The seat occupant discrimination system includes a plurality of seat occupant sensors. The seat occupant sensors are implemented by load sensors which are installed beneath a seat of the vehicle at different locations. Each of the seat occupant sensors is responsive to part of a weight load of a passenger on the seat to output a signal indicative thereof. The seat occupant discrimination system finds the sum of outputs from all the seat occupant sensors to determine whether the seat is occupied or not and/or whether an occupant on the seat is an adult or a child.

Some of seat occupant sensors of the type as described above have an elastic sensing plate cantilevered by a stationary support member fixed on a floor pan of the vehicle. The sensing plate has a plurality of strain gauges affixed to the surface thereof. Application of a physical load from the seat to the sensing plate causes the sensing plate to be bent. The strain gauges output a signal as a function of the degree of bending of the sensing plate. The signal is used to determine whether the seat is occupied or not and/or whether an occupant on the seat is an adult or a child for controlling actuation of an automotive airbag. For example, Japanese Patent First Publication No. 2000-258234 (U.S. Pat. No. 6,571,647 B1) discloses such a type of sensing plate.

When an excessive load is applied to the sensing plate, it may result in plastic deformation or fracture thereof. In order to avoid this problem, a protective stopper may be installed on the stationary support member. When the load is applied to around the center of the bottom of the seat, it will cause the sensing plate to be bent in the form of an ideal extended S-curve. In this case, the stopper may be located anywhere on the stationary support member. Alternatively, when a passenger sits reclining his or her back on the seat strongly, so that a great load is applied to the back of the seat, it will cause the rotation moment to be applied to the seat. The rotation moment may cause the sensing plate to be bent in the form deviating from the S-curve. In this case, it may be impossible for the stopper to avoid the degree of bending of the sensing plate exceeding the bending stress limit thereof depending upon the location of the stopper.

SUMMARY OF THE INVENTION

It is therefore a principal object of the invention to avoid the disadvantages of the prior art.

It is another object of the invention to provide a seat occupant sensor equipped with a stopper mechanism working to avoid an excessive degree of bending of a sensing plate without sacrificing the accuracy of measuring a physical load on the sensing plate.

According to one aspect of the invention, there is provided a seat occupant sensor for a vehicle designed to measure a weight load of a vehicle passenger on a seat which may be employed in controlling deployment of an airbag of an occupant restraint system. The seat occupant sensor comprises: (a) an upper member having a first and a second end, the upper member being secured at the first end thereof to a seat installed within a vehicle, the upper member experiencing movement upon application of a physical load to the first end which arises from a vehicle passenger on the seat; (b) a lower member having a first and a second end, the lower member being secured at the first end thereof to a body of the vehicle; (c) a sensing member having a length with a first end and a second end opposite the first end, the sensing member being joined at the first end thereof to the second end of the upper member and at the second end thereof to the second end of the lower member so as to permit the sensing member to undergo bending stress as a function of a degree of the physical load on the upper member in response to the movement of the upper member transmitted to the first end of the sensing member from the second end of the upper member, thereby sensing the vehicle passenger on the seat; and (d) a stopper mechanism installed on one of the upper member and the lower member. The stopper mechanism works to stop the sensing member from bending out of a predetermined range in which the sensing member is allowed to undergo a maximum bending stress within a bending stress limit of the sensing member, thereby avoiding mechanical damage or fracture of the sensing member.

In the preferred mode of the invention, the stopper mechanism is disposed at a location which is determined as a function of a difference between an upper limit of a displacement of the sensing member when subjected to a maximum permissible bending stress below the bending stress limit and a lower limit of a displacement of the sensing member when subjected to a minimum load within a desired load measurement range of the sensing member.

The sensing member has a portion serving as a spring which has a length L. The location of the stopper mechanism may be provided at a distance of one of 2L/3 or more and L/3 or less from an end of the spring on a side of the first end of the sensing member according to a location where the physical load is applied to the sensing member.

The stopper mechanism is made up of a stopper hole and a stopper pin. The stopper hole is formed in one of the upper member and the lower member. The stopper pin is installed at one end thereof on the other of the upper member and the lower member and disposed at the other end thereof within the stopper hole to be movable within a clearance between an outer wall of the stopper pin and an inner wall of the stopper hole.

The upper member may be disposed in parallel to the sensing member. This causes a vertical displacement of the seat to be amplified and transmitted to the sensing member through the upper member.

The sensing member may have a rectangular cross section, thereby facilitating bending of the sensing member.

The sensing member may have a strain gauge which outputs a signal as a function of the bending stress acting on the sensing member.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7 is a table II which demonstrates bending modes of a sensing plate for different installed orientations of the sensing plate of a seat occupant sensor;

FIG. 8 represents a dynamic model of a sensing plate in which an offset load is applied thereto and formulas for deriving a bending moment acting on the sensing plate, an angle of inclination of the sensing plate, and a vertical displacement of the sensing plate;

FIGS. 9(a) and 9(b) represent dynamic models of a sensing plate and an upper arm for determining a displacement of a stopper position when the sensing plate is bent upon application of load thereto;

FIG. 10 is a table III which lists bending modes of a sensing plate and relations between a stopper displacement and a stopper position;

FIG. 14 is an explanatory view for determining an optimum position of a stopper mechanism of a rear seat occupant sensor; and FIG. 15 is an explanatory view for determining an optimum position of a stopper mechanism of a front seat occupant sensor.

DESCRIPTION OF THE PREFERRED EMBODIMENTS

Figure 1:
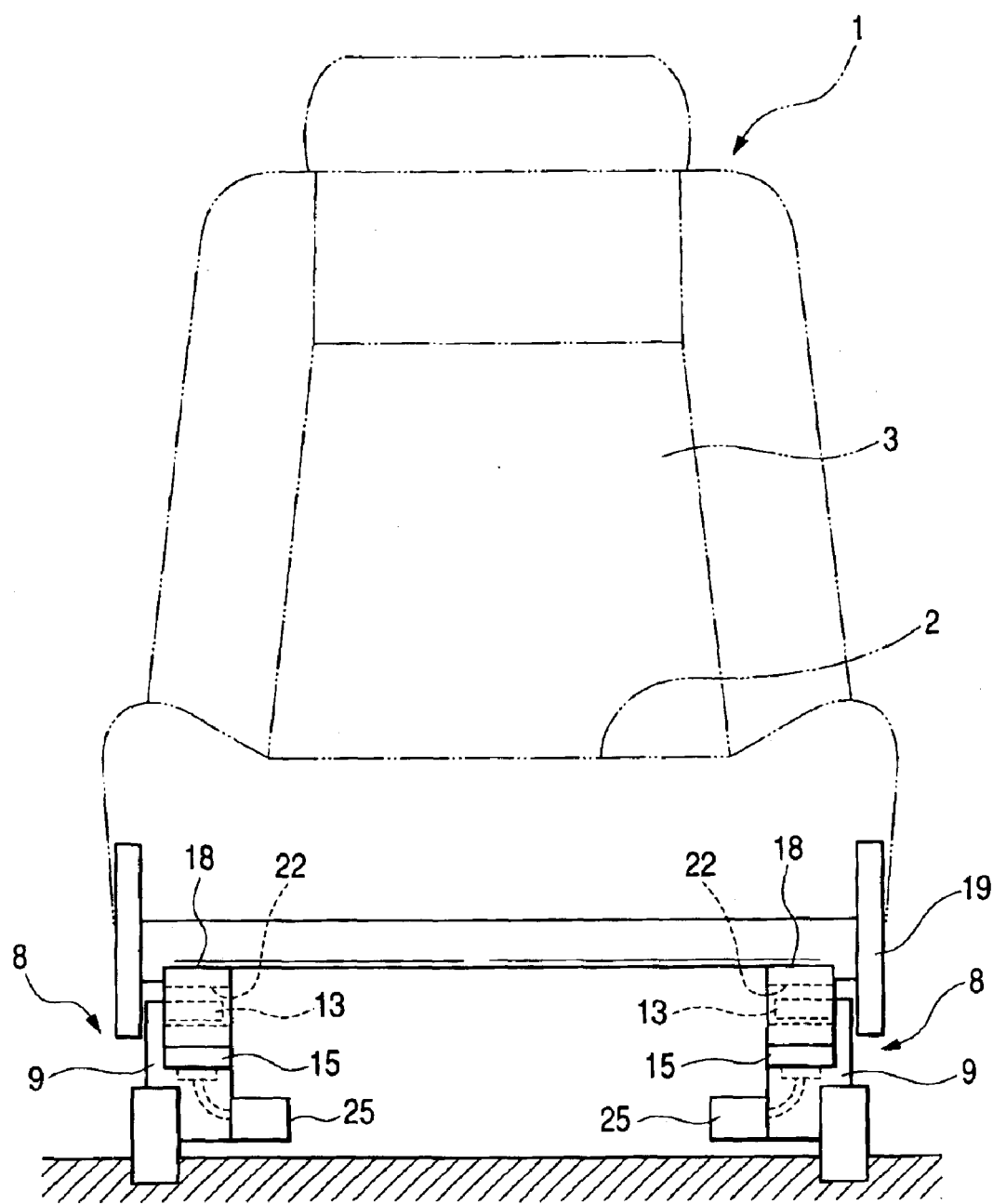
FIG. 1 is a front view which shows seat occupant sensors installed on a seat of an automotive vehicle according to the invention.
Figure 2A:
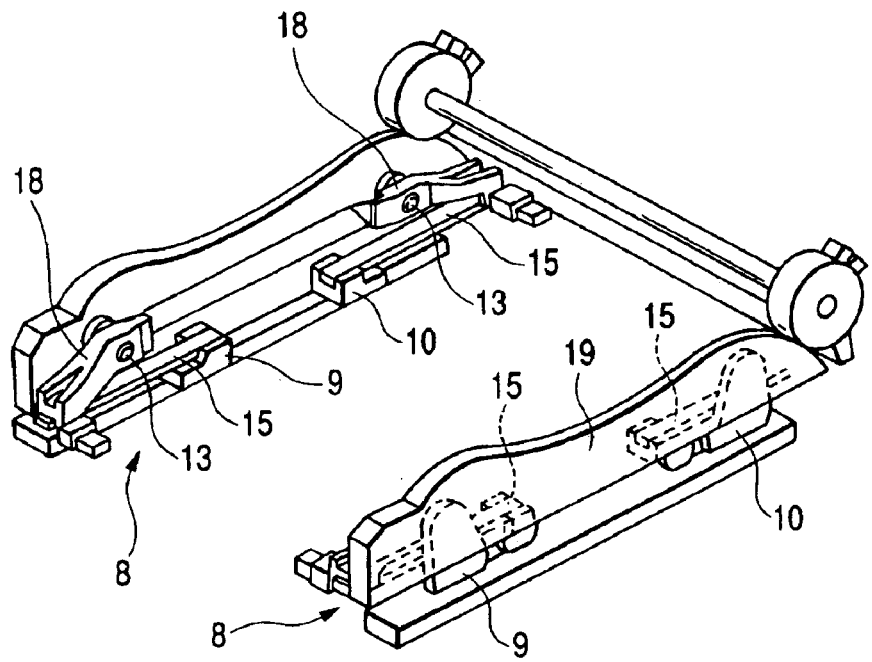
FIG. 2(a) is a partially perspective view which shows seat occupant sensors installed on a frame of a seat.
Figure 2B:
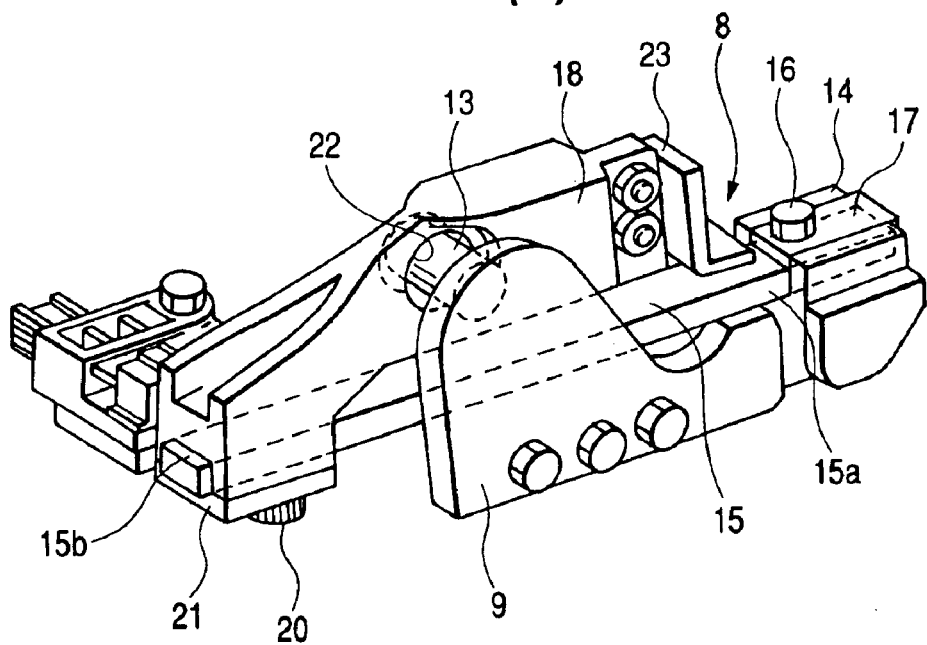
FIG. 2(b) is an enlarged view of a seat occupant sensor.
Figure 3:
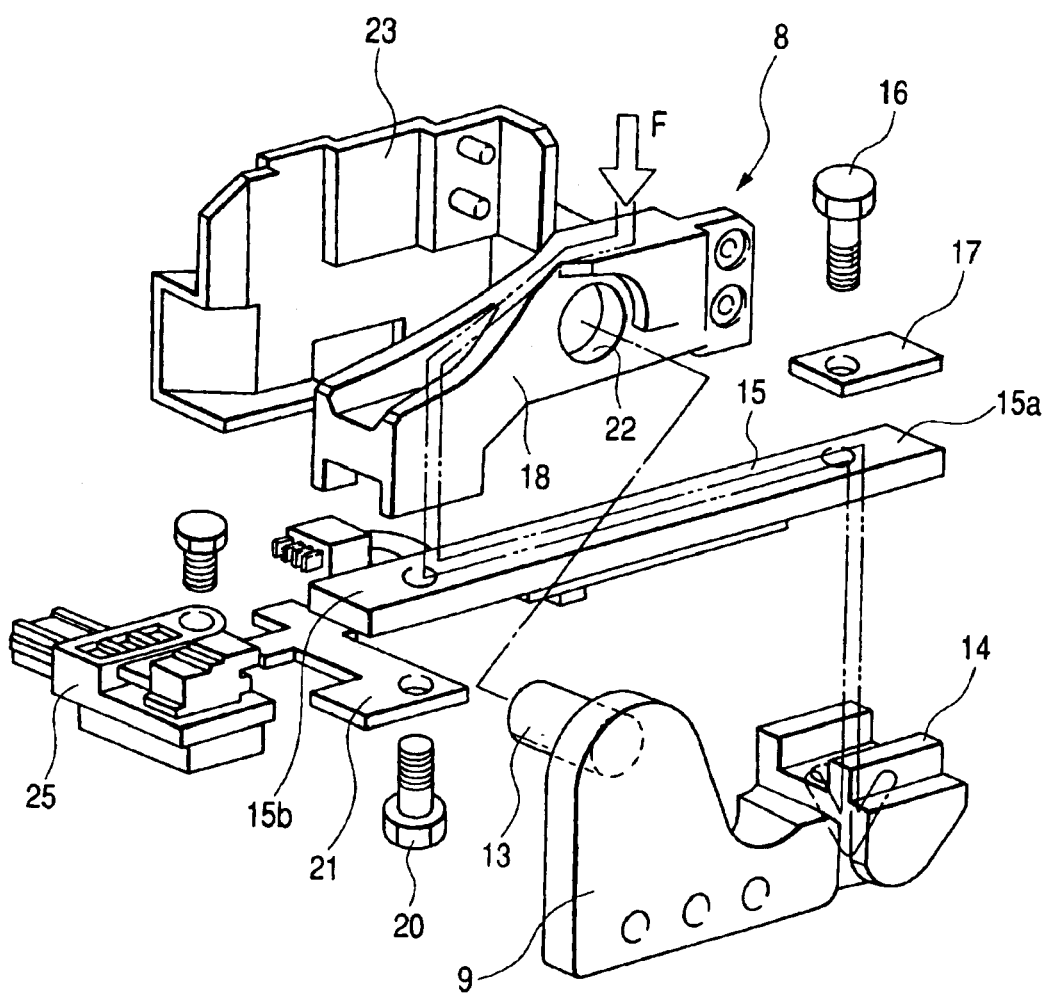
FIG. 3 is an exploded view which shows a seat occupant sensor.

Referring to the drawings, wherein like reference numbers refer to like parts in several views, particularly to FIGS. 1 to 3, there is shown seat occupant sensors 8 which are employed, for example, in an automotive seat occupant discrimination system (not shown) working to determine whether a vehicle seat is occupied or not and/or whether an occupant on the seat is an adult or a child for controlling the deployment of a passenger side airbag of an occupant restraint system.

The seat occupant sensors 8 are installed, as an example, beneath a front passenger's seat 1 of an automotive vehicle. The seat 1 is made up of a seat cushion 2 and a seat back 3 and, as shown in FIGS. 1 and 2(a), on a seat frame 19. The seat occupant sensors 8 are, as can be seen from FIGS. 1 and 2(a), disposed on a front right, a rear right, a front left, and a rear left portions of the seat frame 19, respectively. The front seat occupant sensors 8 include lower arms 9. The rear seat occupant sensors 8 include lower arms 10. The lower arms 9 and 10 are mounted on a floor pan of the vehicle in diametrically opposed orientations in a longitudinal direction of the vehicle. In other words, the lower arms 9 are mirror-image symmetrical with the lower arms 10 about a lateral direction of the vehicle. Specifically, the front right and rear right seat occupant sensors 8, as illustrated in FIG. 2(a), are substantially identical in structure except for orientation of component parts thereof in a longitudinal direction of the vehicle. The same is true for the front left and rear left seat occupant sensors 8. For the sake of simplicity of disclosure, the following discussion will refer only to the front left seat occupant sensor 8, as illustrated in FIG. 2(b). Note that the seat occupant sensors 8, as will be discussed later in detail, may be installed either in the same directional orientation or in the opposite directional orientation.

The seat occupant sensor 8, as will be described later in detail, is sensitive to a weight load of an occupant on the seat 1 to provide an electric signal indicative thereof. The seat occupant sensor 8 also includes a stopper pin 13, a sensing plate 15 and an upper arm 18. The stopper pin 13 is affixed to the lower arm 9 and extends inwardly of the seat 1 in the lateral direction of the vehicle. The lower arm 9 has a mount base 14 on which the sensing plate 15 is cantilevered at an end 15a thereof through a bolt 16 and a lock plate 17. The sensing plate 15 is made of a spring strip having a rectangular cross section and extends in the longitudinal direction of the vehicle substantially in parallel to the upper arm 18.

The upper arm 18 is secured at an end thereof to the seat frame 19 on which the seat 1 is mounted and at the other end to a free end or movable end 15b of the sensing plate 15 through a bolt 20 and a lock plate 21. The upper arm 18 has formed therein a stopper hole 22 of a preselected diameter into which the stopper pin 13 extends with a given clearance, as will be described later in detail, between itself and an inner wall of the stopper hole 22. This permits the upper arm 18 to move vertically until the inner wall of the stopper hole 22 hits on the outer surface of the stopper pin 13. When the inner wall of the stopper hole 22 hits on the stopper pin 13, it will cause the weight load of an occupant on the seat 1 to be transmitted from the upper arm 18 directly to the lower arm 9 without reaching the sensing plate 15. An inside wall of the upper arm 18 is wrapped, as clearly shown in FIG. 3, with a resinous protective cover 23.

When a vehicle passenger sits on the seat 1, it will cause the weight load of the passenger to be transmitted from the seat frame 19, as indicated by an arrow F in FIG. 3, to the upper end of the upper arm 18, and to the lower end thereof. The load then travels to the movable end 15b of the sensing plate 15, thus causing the sensing plate 15 to be swung or bent from the fixed end 15a thereof. Application of an excessive load to the sensing plate 15 causes the inner wall of the stopper hole 22 to hit on the stopper pin 13, thereby avoiding undesirable deflection or fracture of the sensing plate 15.

Figure 4A:
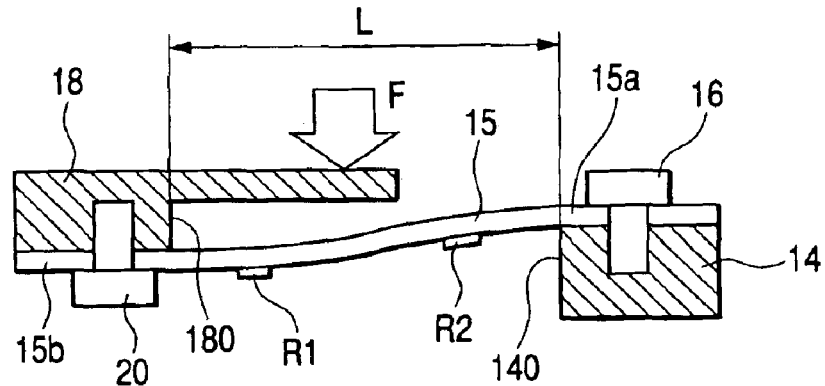
FIG. 4(a) is a side view which shows a sensing plate of a seat occupant sensor.
Figure 4B:
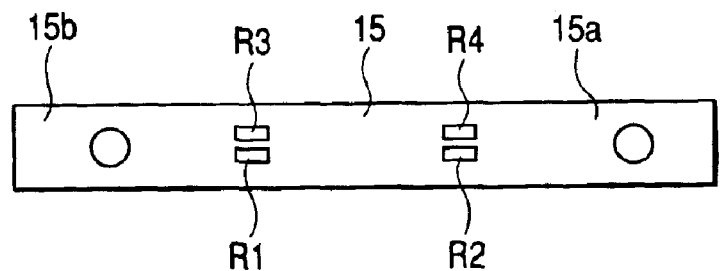
FIG. 4(b) is a bottom view of the sensing plate of FIG. 4(a)
Figure 4C:
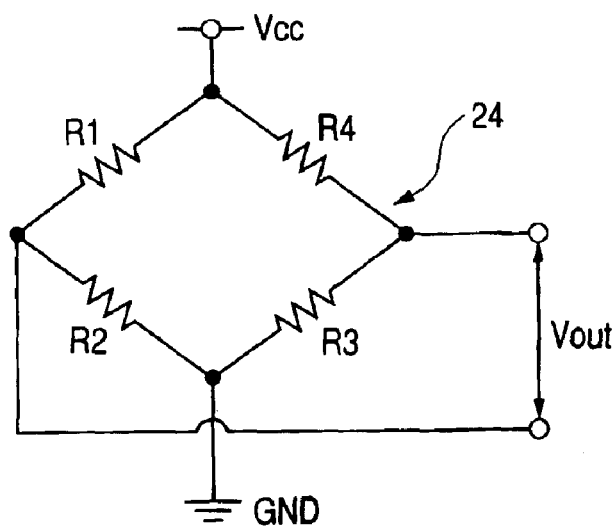
FIG. 4(c) is a circuit diagram which shows a bridge circuit made up of strain gauges attached to the bottom of the sensing plate, as illustrated in FIG. 4(b)

The sensing plate 15 has, as shown in FIGS. 4(a) and 4(b), four strain gauges R1 to R4 affixed or bonded to different areas on a lower surface thereof. Each of the strain gauges R1 to R4 is, as is well known in the art, responsive to application of compressive stress or tensile stress to change an electrical resistance thereof. The strain gauges R1 to R4 are electrically coupled, as illustrated in FIG. 4(c), to constitute a strain-gauge bridge 24. Each of the seat occupant sensors 8 is, as shown in FIG. 1, connected to an amplifier 25. The amplifier 25 works to amplify a change in output voltage Vout developed at the strain-gauge bridge 24 and provides a signal as indicating a physical load acting on the seat 1 to the seat occupant discrimination system for determining whether the seat 1 is occupied or not and/or whether an occupant on the seat 1 is an adult or a child based on comparison with given thresholds.

In order to ensure the sensitivity of the seat occupant sensor 8 for an extended period of time and maximize a measurement range thereof, it is advisable to allow the sensing plate 15 to be maximized in the degree of bending thereof without experiencing mechanical damage or fracture even upon application of an offset load, as will be described later in detail, over a bending stress limit of the sensing plate 15. In order to achieve this, each of the seat occupant sensors 8 is designed to have a stopper mechanism made up of the stopper pin 13 and the stopper hole 22 and locate it at an optimum position, as determined mathematically by the inventors of this application. The optimum position depends upon the location and installed orientation of the seat occupant sensor 8 and the mode of application of a physical load to the seat 1 and is defined in this embodiment at a distance of 2L/3 or L/3 from the movable end 15b of the sensing plate 15 where L is, as can be seen in FIG. 4(a), the length of a portion of the sensing plate 15 serving as a spring. Specifically, the length L is equal to the distance between an inner edge 180 of the upper arm 18 and an inner edge 140 of the mount base 14 of the lower arm 9 or 10. The optimum position is selected at a distance of 2L/3 or L/3 from the inner edge 180 of the upper arm 18.

The determination of the optimum position is based on analysis as described below.

The installed orientation of the seat occupant sensors 8 is, as illustrated in FIG. 7, broken down into two types: a same directional orientation and an opposite directional orientation. The same directional orientation is to orient the length of the sensing plates 15 of all the seat occupant sensors 8 in the same direction. Specifically, it represents a condition in which all the sensing plates 15 extend from the mount bases 14 of the lower arms 9 and 10 in the same longitudinal direction of the vehicle (i.e., a frontward or a rearward orientation). The opposite directional orientation is to orient the length of the sensing plates 15 of front two of the seat occupant sensors 8 in a direction opposite that of the rear two. Specifically, it represents a condition in which the sensing plates 15 of the front seat occupant sensors 8 extend from the mount bases 14 of the lower arms 9 in a direction opposite that of the rear seat occupant sensors 8 (i.e., an outward or an inward orientation).

Figure 5B:
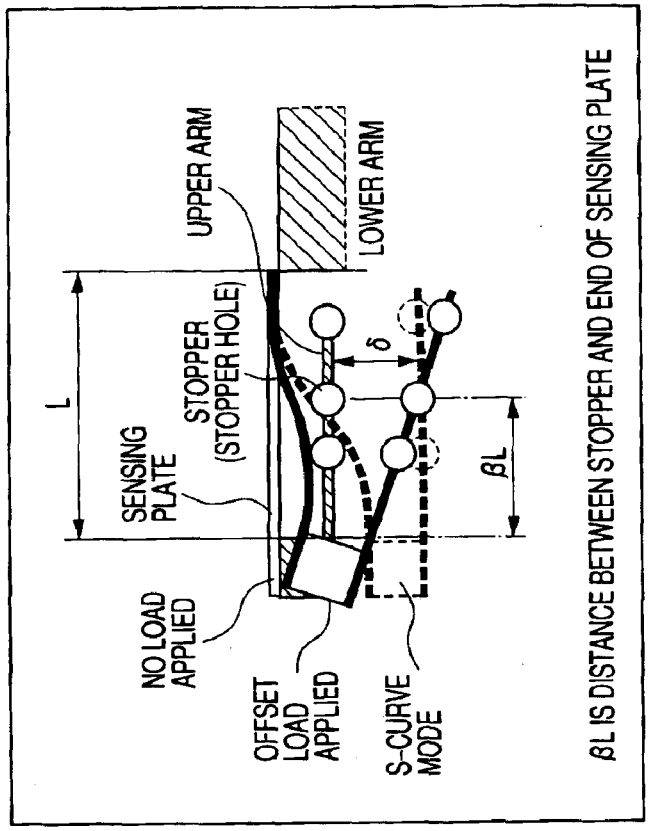
FIG. 5(b) is a view which shows a relation between a stopper location and a stopper displacement in an offset load applied mode.
Figure 5A:
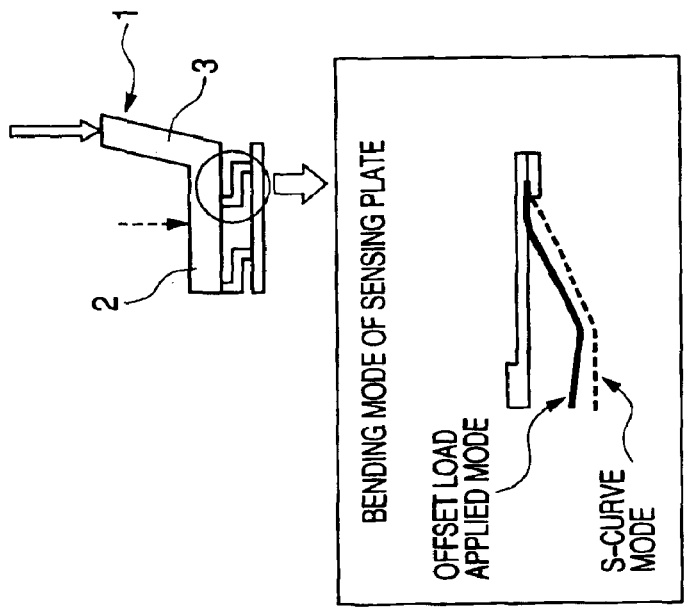
FIG. 5(a) illustrates a bending mode of a sensing plate of a seat occupant sensor installed in frontward orientation.

FIG. 5(a) illustrates the frontward orientation of the seat occupant sensors 8. When an offset load is applied to the seat 1, for example, when a load, as indicated by a bold arrow, is applied to the seat back 3 of the seat 1, it causes the sensing plate 15 of each of the rear seat occupant sensors 8 to be bent in the form of a curve, as indicated by a solid line, different from an ideal S-curve, as indicated by a broken line, which is assumed by the sensing plate 15 when a load, as indicated by a broken arrow, is applied to around the center of the cushion 2. These two bending modes are demonstrated in FIG. 5(b) in terms of a relation between the location of the stopper mechanism made up of the hole 22 and the stopper pin 13 (which will also be referred to as a stopper position below) and the displacement of the stopper hole 22 (which will also be referred to as a stopper displacement below). The label "stopper" in FIG. 5(b) represents the stopper hole 22. In a case where the stopper pin 13 is disposed in the stopper hole 22 coaxially with each other, that is, where the longitudinal center line of the stopper pin 13 coincides with the center of the stopper hole 22, the stopper positions is the position of the center of the stopper pin 13 and the stopper hole 22. For the sake of ease of understanding of the bending modes, the upper arm 18 is, unlike the actual case, illustrated as being disposed below the sensing plate 15. Application of the load to the seat back 3 of the seat 1, as shown in FIG. 5(a), creates an offset load acting on the sensing plate 15, which causes rotation moment or torque to be exerted on the movable end 15b of the sensing plate 15 which is greater than that on the fixed end 15a. This produces a bending moment which bends the sensing plate 15, as indicated by an upper one of solid lines in FIG. 5(b). At the same time, the upper arm 18 is moved or displaced downward, as indicated by the lower solid line. The stopper hole 22 is moved, as expressed by circles, by a distance which varies as a function of the stopper position (i.e., the location of the stopper hole 22 in the upper arm 18).

Figure 6:
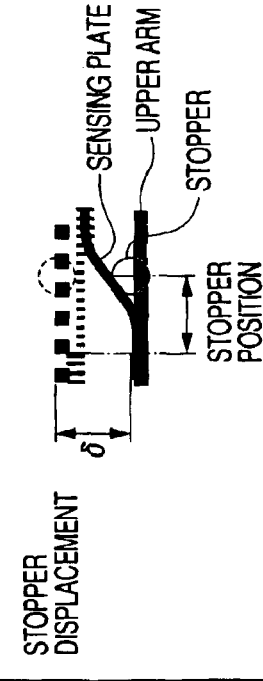
FIG. 6 is a table I which demonstrates relations among modes of application of load to a seat, bending modes of a sensing plate, and dynamic models of the sensing plate.

FIG. 6 is a table I which demonstrates relations among modes of application of load to the seat 1, bending modes of the sensing plate 15, and dynamic models of the sensing plate 15.

Upper cells represent a cushion-loaded mode in which a load is applied to the center of the cushion 2 of the seat 1. The rotation moment or torque greater than that exerted on the fixed end 15a of the sensing plate 15 does not act on any area of the sensing plate 15, thus causing the sensing plate 15 to be bent in the form of the ideal S-curve. Lower cells represent a seat back-loaded mode in which a load is applied to the seat back 3 of the seat 1. This offset load produces torque greater than that in the cushion-loaded mode which causes the sensing plate 15 to be bent in the form of an undesirable curve different from the ideal S-curve.

FIG. 7 is a table II which demonstrates bending modes of the sensing plate 15 for different installed orientations of the sensing plates 15 of the seat occupant sensors 8.

As is apparent from the table, the sensing plate 15 of the rear seat occupant sensor 8 installed in the inward orientation, as illustrated in the cell b, has the same bending mode as that of the rear seat occupant sensor 8 installed in the frontward orientation, as illustrated in the cell f. The sensing plate 15 of the rear seat occupant sensor 8 installed in the outward orientation, as illustrated in the cell d, has the same bending mode as that of the rear seat occupant sensor 8 installed in the rearward orientation, as illustrated in the cell h. The sensing plate 15 of the front seat occupant sensor 8 installed in the inward orientation, as illustrated in the cell a, has the same bending mode as that of the front seat occupant sensor 8 installed in the outward orientation, as illustrated in the cell g. The sensing plate 15 of the front seat occupant sensor 8 installed in the outward orientation, as illustrated in the cell c, has the same bending mode as that of the front seat occupant sensor 8 installed in the frontward orientation, as illustrated in the cell e.

FIG. 8 represents a dynamic model of the sensing plate 15 in which the offset load W is applied thereto and formulas for deriving a bending moment M(x) acting on the sensing plate 15, an angle of inclination Ik(x) of the sensing plate 15, and a vertical displacement Yk(x) of the sensing plate 15.

The bending moment M(x) acting on a portion of the sensing plate 15 which is at a distance of x from the movable end 15b (i.e., the inner edge 180 in FIG. 4(a)) is given by $$M(x) = Wx - \alpha L W \quad (1)$$

Note that $d^2y/dx^2 = -M/EI = W/EI \, (\alpha L - x)$
where L is, as already described in FIG. 4(a), the length of a portion of the sensing plate working as a spring, α is a ratio of the distance between the movable end 15b (i.e., the inner edge 180 in FIG. 4(a)) and the location where the load W is applied to the sensing plate 15 to the length L, and EI is the flexural rigidity of the sensing plate 15.

The angle Ik of inclination of the sensing plate 15 when subjected to the load W is expressed below in terms of the bending moment M(x), the flexural rigidity EI, and a radius of curvature of the sensing plate when being bend.

$$Ik(x) = dy/dx \quad (2)$$
$$= (W/2EI) \cdot \{-x^2 + 2\alpha L \cdot x + (1 - 2\alpha)L^2\}$$

By integrating Eq. (2) in consideration of boundary conditions, we obtain the displacement Yk(x) of the sensing plate 15 resulting from application of the load W as follow:

$$Yk(x) = \int Ik(x)dx \quad (3)$$
$$= (-W/6EI) \cdot \{-x^3 + 3\alpha L \cdot x^2 + (3 - 6\alpha)L^2\} \cdot x +$$
$$(3\alpha - 2)L^3\}$$

Note that a downward displacement of the sensing plate 15 is expressed in a positive (+) value.

FIGS. 9(a) and 9(b) represent dynamic models of the sensing plate 15 and the upper arm 18 for determining the displacement Ys of the stopper position (i.e., the stopper hole 22) when the sensing plate 15 is bent upon application of load thereto.

The displacement Ys of the stopper position, as illustrated in FIG. 9(b), is expressed below using the displacement Yk(x) and the inclination angle Ik of the sensing plate 15 when x=0.

$$Ys = Yk(x = 0) + \delta \quad (4)$$
$$= Yk(x = 0) + \beta \cdot L \cdot \tan\{Ik(x = 0)\}$$
$$= (WL^3/6EI) \cdot \{(2 - 3\alpha) - 3\beta(1 - 2\alpha)\}$$

where β is a ratio of the distance between the movable end 15b and the location of the stopper mechanism or the stopper hole 22 to the length L of the sensing plate 15.

When the load W is applied to a fixed side of the sensing plate 15 (i.e., a portion of the sensing plate 15 closer to the fixed end 15a than the center thereof, the bending stress σ of the sensing plate 15 is maximized when x=0. The maximum bending stress σmax and the modulus of section Z bear the following relation:

$$\sigma\text{max} = M\text{max}/Z = -(\alpha LW/Z) \quad (5)$$

From Eqs. (4) and (5), we obtain $$Ys = (L^2/3\alpha Et)\{(2-3\alpha) - 3\beta(1-2\alpha)\} \cdot \sigma\text{max} \quad (6)$$

Substituting the geometrical moment of inertia $I = bt^3/12$ into Eq. (4), we obtain the following relation between the stopper displacement Ys and the load W.

$$Ys = (2L^3/Ebt^3)\{(2-3\alpha) - 3\beta(1-2\alpha)\} \cdot W \quad (7)$$

where b is the width of the sensing plate 15, and t is the thickness of the sensing plate 15.

FIG. 10 is a table III which lists bending modes of the sensing plate 15 and relations between the stopper displacement Ys and the stopper position βL (=Ls). The table III shows that the relation between the stopper displacement Ys and the stopper position depends upon the bending mode of the sensing plate 15.

Next, from the above formula of the stopper displacement Ys, a maximum allowable clearance will be determined which is a maximum gap between the outer surface of the pin 13 and the inner surface of the stopper hole 22 within which the stopper hole 22 is allowed to move vertically without having the sensing plate 15 experience a bending stress limit, that is, plastic deformation. Specifically, the maximum allowable clearance is so determined as to permit the degree of bending of the sensing plate 15 to be maximized without fracture thereof and depends upon the stopper position βL (=Ls) that is the distance between the movable end 15b and the stopper hole 22. The determination of a stopper position coefficient β is made by determining the stopper position βL in which the maximum allowable clearance is established. In the case where the stopper pin 13 is disposed coaxially with the stopper hole 22, the maximum allowable clearance is uniform over the circumference of the stopper pin 13. The stopper pin 13 may alternatively be disposed eccentrically with the stopper hole 22. In this case, the maximum allowable clearance is defined above or below the stopper pin 13 as required by specifications of the seat occupant discrimination system.

Figure 11A:
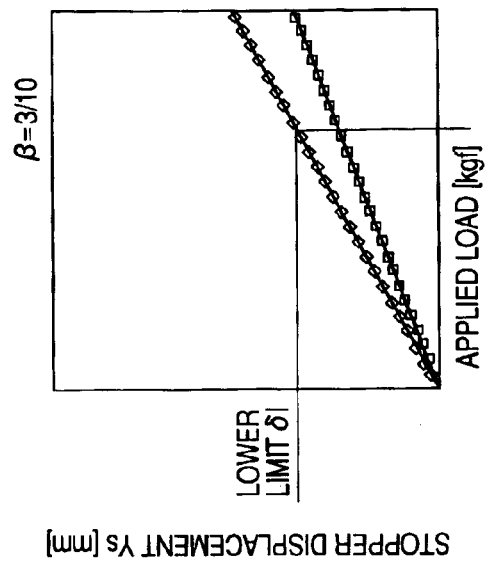
FIG. 11(a) is a graph which shows relations between a maximum bending stress and a stopper displacement when a stopper position coefficient β is 3/10, and when a load is applied to the center of a sensing plate and a fixed end side of the sensing plate.
Figure 11B:
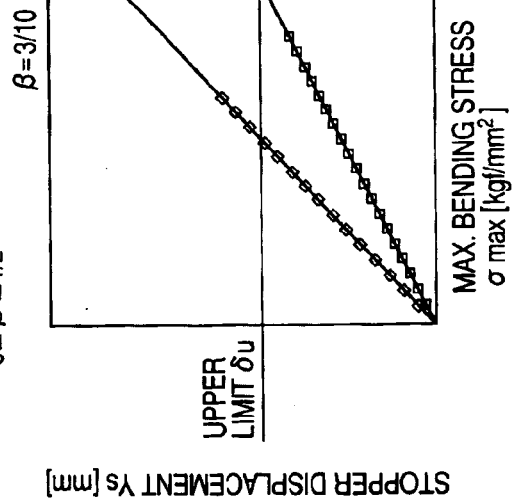
FIG. 11(b) is a graph which shows relations between a load applied to a sensing plate and a stopper displacement when a stopper position coefficient β is 3/10, and when the load is applied to the center of the sensing plate and a fixed end side of the sensing plate.

FIGS. 11(a) and 11(b) represent relations between the maximum bending stress σmax and the stopper displacement Ys and between the applied load W and the stopper displacement Ys, respectively. The maximum allowable clearance Yt is determined, as will be described below in detail, by a difference between an upper limit δu and a lower limit δl (Yt=δu−δl). The upper limit δu is determined in consideration of usual and unusual locations at which the load W is applied to the seat 1 for avoiding application of an excessive load (i.e., an excessive stress) to the sensing plate 15 which results in plastic deformation or fracture of the sensing plate 15. For instance, the upper limit δu is selected from the graph of FIG. 11(a) as the displacement of the stopper hole 22 (i.e., the stopper displacement Ys) when a maximum permissible load equal to or slightly less than the bending stress limit of the sensing plate 15 is applied to the sensing plate 15. The lower limit δl is determined on condition the stopper pin 13 does not hit the inner surface of the stopper hole 22 easily in an usual travel condition of the vehicle for ensuring a desired load measurement range of the seat occupant sensors 8 and providing good riding comfort to vehicle passengers. For instance, the lower limit δl is selected from the graph of FIG. 11(b) as the stopper displacement Ys when the lowest load within the desired load measurement range is applied to the sensing plate 15.

FIG. 11(a) shows σmax-Ys lines indicating relations between the maximum bending stress σmax and the stopper displacement Ys when the stopper position coefficient β is 3/10 (0≦β≦1/2), and when the load W is applied to the center of the sensing plate 15 (α=1/2) and a fixed end side of the sensing plate 15 (α=2/3) FIG. 11(b) shows W-Ys lines indicating relations between the load W applied to the sensing plate 15 and the stopper displacement Ys when the stopper position coefficient β is 3/10 (0≦β≦1/2), and when the load W is applied to the center of the sensing plate 15 (α=1/2) and a fixed end side of the sensing plate 15 (α=2/3). The upper limit δu is determined in FIG. 11(a) based on the σmax-Ys line whose inclination is the smaller (i.e., the offset load apply mode) and calculated by substituting α=2/3 and σmax=σe into Eq. (6) where σe is the bending stress limit of the sensing plate 15. Specifically, we obtain $$\delta u = (L^2/2Et)\cdot\beta\cdot\sigma e \qquad (6.1)$$

The lower limit δl is determined in FIG. 11(b) based on the W-Ys line whose inclination is the greater (i.e., the ideal S-curve bending mode) and calculated by substituting α=1/2 and W=Wl into Eq. (7) where Wl is, as described above, a lower limit of the desired load measurement range of the seat occupant sensors 8.
Specifically, we obtain $$\delta l = (L^3\cdot W1)/Ebt^3 \qquad (7.1)$$

Thus, the maximum allowable clearance Yt (=δu−δl) is given by $$Yt=(L^2/2Et)\cdot\sigma e\cdot\beta-(L^3\cdot W1)/Ebt^3 \qquad (8)$$

Figure 12A:
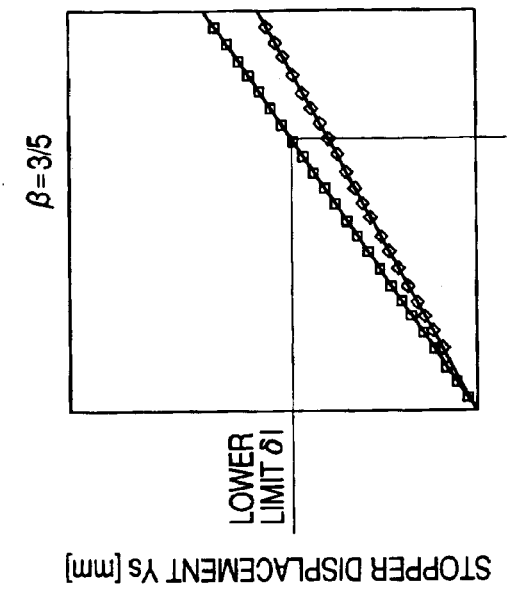
FIG. 12(a) is a graph which shows relations between a maximum bending stress and a stopper displacement when a stopper position coefficient β is 3/5, and when a load is applied to the center of a sensing plate and a fixed end side of the sensing plate.
Figure 12B:
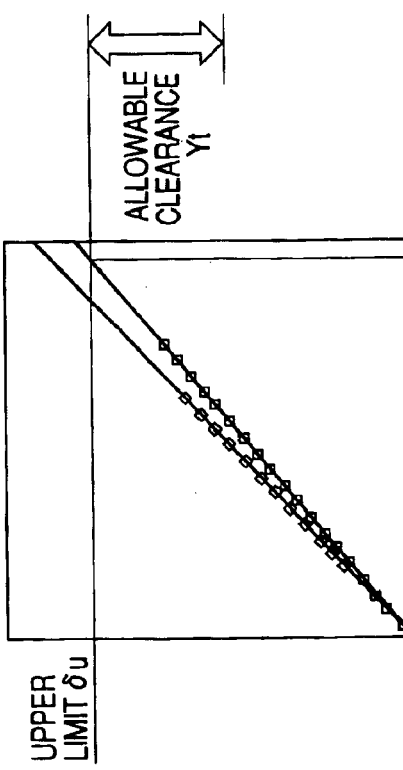
FIG. 12(b) is a graph which shows relations between a load applied to a sensing plate and a stopper displacement when a stopper position coefficient β is 3/5, and when the load is applied to the center of the sensing plate and a fixed end side of the sensing plate.

FIG. 12(a) shows σmax-Ys lines indicating relations between the maximum bending stress σmax and the stopper displacement Ys when the stopper position coefficient β is 3/5 (1/2≦β≦2/3), and when the load W is applied to the center of the sensing plate 15 (α=1/2) and the fixed end side of the sensing plate 15 (α=2/3). FIG. 12(b) shows W-Ys lines indicating relations between the load W and the stopper displacement Ys when the stopper position coefficient β is 3/5 (1/2≦β≦2/3), and when the load W is applied to the center of the sensing plate 15 (α=1/2) and the fixed end side of the sensing plate 15 (α=2/3). The upper limit δu is determined in FIG. 12(a) based on the σmax-Ys line in the offset load apply mode and calculated by substituting α=2/3 and σmax=σe into Eq. (6). Specifically, we obtain Eq. (6.2), as indicated in the drawing, that is identical with Eq. (6.1). The lower limit βl is determined in FIG. 12(b) based on the W-Ys line in the offset load apply mode and calculated by substituting α=2/3 and W=Wl into Eq. (7). Specifically, we obtain $$\delta l=(2L^3\cdot\beta W1)/Ebt^3 \qquad (7.2)$$

Thus, the maximum allowable clearance Yt (=δu−δl) is given by $$Yt=(L^2/2Et)\cdot\beta\cdot\sigma e-(2L^3\cdot\beta\cdot W1)/Ebt^3 \qquad (9)$$

Figure 13B:
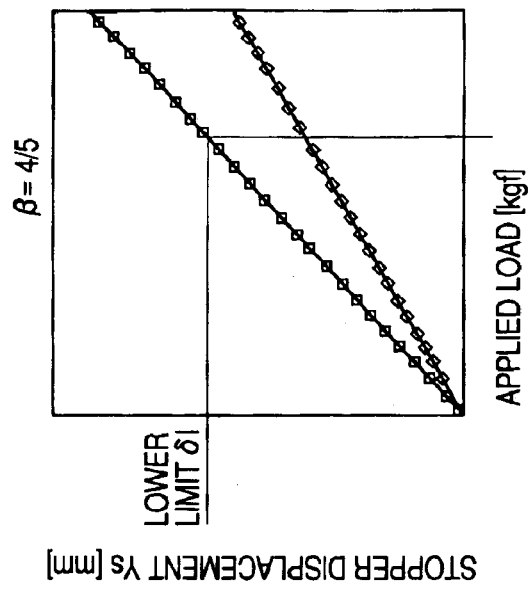
FIG. 13(b) is a graph which shows relations between a load applied to a sensing plate and a stopper displacement when a stopper position coefficient β is 4/5, and when the load is applied to the center of the sensing plate and a fixed end side of the sensing plate.
Figure 13A:
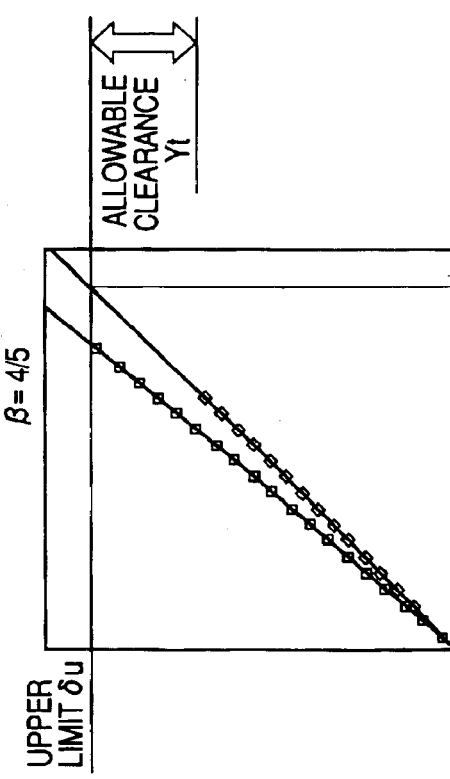
FIG. 13(a) is a graph which shows relations between a maximum bending stress and a stopper displacement when a stopper position coefficient β is 4/5, and when a load is applied to the center of a sensing plate and a fixed end side of the sensing plate.

FIG. 13(a) shows σmax-Ys lines indicating relations between the maximum bending stress σmax and the stopper displacement Ys when the stopper position coefficient β is 4/5 (β≧4/5), and when the load W is applied to the center of the sensing plate 15 (α=1/2) and the fixed end side of the sensing plate 15 (α=2/3). FIG. 13(b) shows W-Ys lines indicating relations between the load W and the stopper displacement Ys when the stopper position coefficient β is 4/5 (β≧4/5), and when the load W is applied to the center of the sensing plate 15 (α=1/2) and the fixed end side of the sensing plate 15 (α=2/3). The upper limit δu is determined in FIG. 13(a) based on the σmax-Ys line in the ideal S-curve bending mode and calculated by substituting α=1/2 and σmax=σe into Eq. (6).
Specifically, we obtain $$\delta u=(L^2/3Et)\cdot\sigma e \qquad (6.3)$$

The lower limit δl is determined in FIG. 13(b) based on the W-Ys line in the offset load apply mode and calculated by substituting α=2/3 and W=Wl into Eq. (7). Specifically, we obtain Eq. (7.3), as indicated in the drawing, that is identical with Eq. (7.2).

Thus, the maximum allowable clearance Yt (=δu−δl) is given by $$Yt=(L^2/3Et)\cdot\sigma e-(2L^3\cdot\beta W1)/Ebt^3 \qquad (10)$$

FIG. 14 illustrates relations among Eqs. (6.1), (6.2), and (6.3) of the upper limit δu, Eqs. (7.1), (7.2), and (7.3) of the lower limit δl, and Eqs. (8) and (9) of the maximum allowable clearance Yt.

The optimum position of the stopper mechanism is indicated by M, i.e., an intersection of Eqs. (9) and (10). Therefore, by setting Eq. (9)=Eq. (10), i.e., $L^2$ σeβ/2Et=$L^3$ σe/3Et, we obtain β=2/3. This means that the stopper mechanism, that is, the center of the stopper hole 22 is preferably located at a distance of 2L/3 from the movable end 15b (i.e., the inner edge 180 in FIG. 4(a)) of the sensing plate 15 in the rear seat occupant sensors 8 installed in the same directional forward orientation in which the offset load is applied to the fixed end side of the sensing plate 15 (see FIGS. 7 and 9).

FIG. 15 represents the relation among the upper and lower limits δu and δl and the maximum allowable clearance Yt in the front seat occupant sensors 8 installed in the same directional forward orientation in which the offset load is applied to the movable end side of the sensing plate 15 (see the movable end offset load applied mode in FIG. 10). The front seat occupant sensors 8 are reverse in the fixed and movable ends 15a and 15b to the rear seat occupant sensors 8, as referred to in FIG. 14. The optimum position of the stopper mechanism is, thus, determined by replacing β with (1−β) in Eqs. (9) and (10). Specifically, by $L^2$ σe (1−β)/2Et=$L^3$ σe/3Et, we obtain β=1/3. This means that the center of the stopper hole 22 of the front seat occupant sensors 8 is preferably located at a distance of L/3 from the movable end 15b of the sensing plate 15.

The optimum position of the stopper mechanism is determined generally in terms of the location and installed orientation of each of the seat occupant sensors 8, as shown in FIG. 7. The seat occupant sensors 8, as illustrated in the cells a, b, f, and g, belong to the same class in terms of applied orientations of load and bending moment acting on the sensing plate 15. The seat occupant sensors 8, as illustrated in the cells c, d, e, and h, belong to the same class as the one of FIG. 15 in terms of applied orientations of load and bending moment acting on the sensing plate 15. Specifically, the optimum position of the stopper mechanism of each of the seat occupant sensors 8, as illustrated in the cells a, b, f, and g, is at a distance of 2L/3 from the movable end 15b of the sensing plate 15. The optimum position of the stopper mechanism of each of the seat occupant sensors 8, as illustrated in the cells c, d, e, and h, is at a distance of L/3 from the movable end 15b of the sensing plate 15.

The above discussion has referred to selection of the stopper position coefficient β which provides a maximum displacement of the stopper hole 22, that is, the maximum allowable clearance Yt of the stopper hole 22 when the offset load is applied to the seat 1, i.e., the sensing plate 15 cantilevered by the lower arm 9 or 10. Specifically, the optimum position of the stopper hole 22 is determined to a location at a distance of 2L/3 or L/3 from the movable end 15b of the sensing plate 15 in terms of the location, installed orientation, and bending mode of the sensing plate 15. This restricts the bending stress acting on the sensing plate 15 when an excessive offset load is applied thereto which results in abutment of the inner wall of the stopper hole 22 with the stopper pin 13 to below the bending stress limit, thereby protecting the sensing plate 15 from fracture or undesirable damage. This results in improved durability of the sensing plate 15 and ensures the stability of operation of the seat occupant sensors 8 for an extended period of time.

The optimum position of the stopper hole 22 may also be selected to a location at a distance of more than 2L/3 or less than L/3 from the movable end 15b of the sensing plate 15 in consideration of the protection of the sensing plate 15 or how to use the sensing plate 15.

While, in the above embodiment, the stopper pins 13 are installed on the lower arms 9 and 10, and the stopper holes 22 are formed in the upper arms 18, the stopper pins 13 may be installed on the upper arms 18, and the stopper holes 22 may be formed in the lower arms 9 and 10. The sensing plates 15 may be made of a round, triangular, rhomboid, parallelogrammatic, square, pentagonal, hexagonal (i.e., polygonal), or oval bar as long as it is deformable as a function of a physical load (i.e., the weight of an occupant on the seat 1) applied to the sensing plates 15.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A seat occupant sensor for a vehicle comprising:
   an upper member having a first and a second end, said upper member being secured at the first end thereof to a seat installed within a vehicle, said upper member experiencing movement upon application of a physical load to the first end which arises from a vehicle passenger on the seat;
   a lower member having a first and a second end, said lower member being secured at the first end thereof to a body of the vehicle;
   a sensing member having a length with a first end and a second end opposite the first end, said sensing member being joined at the first end thereof to the second end of said upper member and at the second end thereof to the second end of said lower member so as to permit said sensing member to undergo bending stress as a function of a degree of the physical load on said upper member in response to the movement of said upper member transmitted to the first end of said sensing member from the second end of said upper member, thereby sensing the vehicle passenger on the seat; and
   a stopper mechanism installed on one of said upper member and said lower member above the length of said sensing member, said stopper mechanism working to stop said sensing member from bending out of a predetermined range in which said sensing member is allowed to undergo a maximum bending stress within a bending stress limit of said sensing member.

2. A seat occupant sensor as set forth in claim 1, wherein said stopper mechanism is disposed at a location which is determined as a function of a difference between an upper limit of a displacement of said sensing member when subjected to a maximum permissible bending stress below the bending stress limit and a lower limit of a displacement of said sensing member when subjected to a minimum load within a desired load measurement range of said sensing member.

3. A seat occupant sensor as set forth in claim 2, wherein said sensing member has a portion serving as a spring which has a length L, and wherein the location of said stopper mechanism is at a distance of one of 2L/3 or more and L/3 or less from an end of the spring on a side of the first end of the sensing member according to a location where the physical load is applied to said sensing member.

4. A seat occupant sensor as set forth in claim 1, wherein said stopper mechanism is made up of a stopper hole and a stopper pin, the stopper hole being formed in one of said upper member and said lower member, the stopper pin being installed at one end thereof on the other of said upper member and said lower member and disposed at the other end thereof within the stopper hole to be movable within a clearance between an outer wall of the stopper pin and an inner wall of the stopper hole.

5. A seat occupant sensor as set forth in claim 1, wherein said upper member is disposed in parallel to said sensing member.

6. A seat occupant sensor as set forth in claim 1, wherein said sensing member has a rectangular cross section.

7. A seat occupant sensor as set forth in claim 1, wherein said sensing member has a strain gauge which outputs a signal as a function of the bending stress acting on said sensing member.

8. A seat occupant sensor as set forth in claim 1, wherein said stopper mechanism is disposed closer to the physical load acting on said upper member than said sensing member in a direction of application of the physical load.

9. A seat occupant sensor as set forth in claim 4, wherein the stopper pin is disposed axially in the stopper hole.

10. A seat occupant sensor as set forth in claim 4, wherein an axis of the stopper pin is disposed horizontally.

11. A seat occupant sensor as set forth in claim 4, wherein the outer wall of the stopper pin is cylindrical and the inner wall of the stopper hole is cylindrical.

12. A seat occupant sensor for a vehicle comprising:
    an upper member having a first and a second end, said upper member being secured at the first end thereof to a seat installed within a vehicle, said upper member experiencing movement upon application of a physical load to the first end which arises from a vehicle passenger on the seat;

a lower member having a first and a second end, said lower member being secured at the first end thereof to a body of the vehicle;

a sensing member having a length with a first end and a second end opposite the first end, said sensing member being joined at the first end thereof to the second end of said upper member and at the second end thereof to the second end of said lower member so as to permit said sensing member to undergo bending stress as a function of a degree of the physical load on said upper member in response to the movement of said upper member transmitted to the first end of said sensing member from the second end of said upper member, thereby sensing the vehicle passenger on the seat; and a stopper mechanism installed on one of said upper member and said lower member above the length of said sensing member, said stopper mechanism working to stop said sensing member from bending out of a predetermined range in which said sensing member is allowed to undergo a maximum bending stress within a bending stress limit of said sensing member;

wherein said stopper mechanism is disposed at a location which is determined as a function of a difference between an upper limit of a displacement of said sensing member when subjected to a maximum permissible bending stress below the bending stress limit and a lower limit of a displacement of said sensing member when subjected to a minimum load within a desired load measurement range of said sensing member;

wherein said stopper mechanism is made up of a stopper hole and a stopper pin, the stopper hole being formed in one of said upper member and said lower member, the stopper pin being installed at one end thereof on the other of said upper member and said lower member and disposed at the other end thereof within the stopper hole to be movable vertically within a clearance between an outer wall of the stopper pin and an inner wall of the stopper hole.

13. A seat occupant sensor as set forth in claim 12, wherein said sensing member has a portion serving as a spring which has a length L, and wherein the location of said stopper mechanism is at a distance of one of 2L/3 or more and L/3 or less from an end of the spring on a side of the first end of the sensing member according to a location where the physical load is applied to said sensing member.

14. A seat occupant sensor as set forth in claim 12, wherein said upper member is disposed in parallel to said sensing member.

15. A seat occupant sensor as set forth in claim 12, wherein said sensing member has a rectangular cross section.

16. A seat occupant sensor as set forth in claim 12, wherein said sensing member has a strain gauge which outputs a signal as a function of the bending stress acting on said sensing member.

17. A seat occupant sensor as set forth in claim 12, wherein said stopper mechanism is disposed closer to the physical load acting on said upper member than said sensing member in a direction of application of the physical load.

18. A seat occupant sensor as set forth in claim 12, wherein the stopper pin is disposed axially in the stopper hole.

19. A seat occupant sensor as set forth in claim 12, wherein an axis of the stopper pin is disposed horizontally.

20. A seat occupant sensor as set forth in claim 12, wherein the outer wall of the stopper pin is cylindrical and the inner wall of the stopper hole is cylindrical.

* * * * *